United States Patent
Tanba et al.

(10) Patent No.: US 8,480,535 B2
(45) Date of Patent: Jul. 9, 2013

(54) CONTROL DEVICE FOR ELECTRIC ROTATING MACHINE IN HYBRID-TYPE POWER TRANSMISSION

(75) Inventors: Toshio Tanba, Nishio (JP); Kan Sasaki, Nishio (JP); Yousuke Hayashi, Nishio (JP); Yuichi Fukuhara, Nishio (JP)

(73) Assignee: Aisin Ai Co., Ltd., Aichi-Ken (JP)

( * ) Notice: Subject to any disclaimer, the term of this patent is extended or adjusted under 35 U.S.C. 154(b) by 706 days.

(21) Appl. No.: 12/699,605

(22) Filed: Feb. 3, 2010

(65) Prior Publication Data

US 2010/0200319 A1    Aug. 12, 2010

(30) Foreign Application Priority Data

Feb. 4, 2009   (JP) .................................. 2009-024112

(51) Int. Cl.
*B60W 20/00*   (2006.01)
*B60W 10/08*   (2006.01)
*B60W 10/10*   (2012.01)

(52) U.S. Cl.
USPC .............. 477/3; 477/5; 180/65.285; 180/338

(58) Field of Classification Search
USPC ..................... 180/65.285, 337, 338; 477/3, 5
See application file for complete search history.

(56) References Cited

U.S. PATENT DOCUMENTS

| | | | | |
|---|---|---|---|---|
| 6,941,830 B2* | 9/2005 | Ibamoto et al. | ................. | 74/339 |
| 7,223,191 B2* | 5/2007 | Aikawa et al. | ................. | 475/200 |
| 7,611,433 B2* | 11/2009 | Forsyth | ............................. | 475/5 |
| 7,632,209 B2* | 12/2009 | Sakamoto et al. | ................. | 477/5 |
| 2002/0088291 A1* | 7/2002 | Bowen | ............................ | 74/339 |
| 2006/0130601 A1* | 6/2006 | Hughes | ........................... | 74/340 |
| 2006/0258506 A1* | 11/2006 | Ibamoto et al. | .................... | 477/5 |
| 2010/0125020 A1* | 5/2010 | Ikegami et al. | ................... | 477/3 |
| 2011/0073393 A1* | 3/2011 | Sasaki | ........................ | 180/65.22 |

FOREIGN PATENT DOCUMENTS

| | | |
|---|---|---|
| DE | 29502906 U1 | 4/1995 |
| DE | 102006019239 A1 | 10/2007 |
| EP | 1122109 A2 | 8/2001 |
| EP | 1199468 A2 | 4/2002 |
| WO | WO 2009/051143 A1 | 4/2009 |

OTHER PUBLICATIONS

European Search Report dated Nov. 3, 2011 issued in the corresponding European Patent Application No. 10001029.7-2421.

* cited by examiner

*Primary Examiner* — Hau Phan
*Assistant Examiner* — Bridget Avery
(74) *Attorney, Agent, or Firm* — Buchanan Ingersoll & Rooney P.C.

(57) ABSTRACT

A hybrid-type power transmission in which an internal combustion engine and an electric rotating machine are used as a source of power for driving an output shaft through a change-speed mechanism. In the hybrid power transmission, the operation of the electric rotating machine is controlled in such a manner that the rotation speed of a rotor-side rotary member is synchronized with the rotation speed of an input-side or output-side rotary member when the rotation speed of the rotor-side rotary member becomes higher in a predetermined difference than the rotation speed of the input-side or output-side rotary member in shifting operation of a sleeve coupled with the rotor-side rotary member.

3 Claims, 7 Drawing Sheets

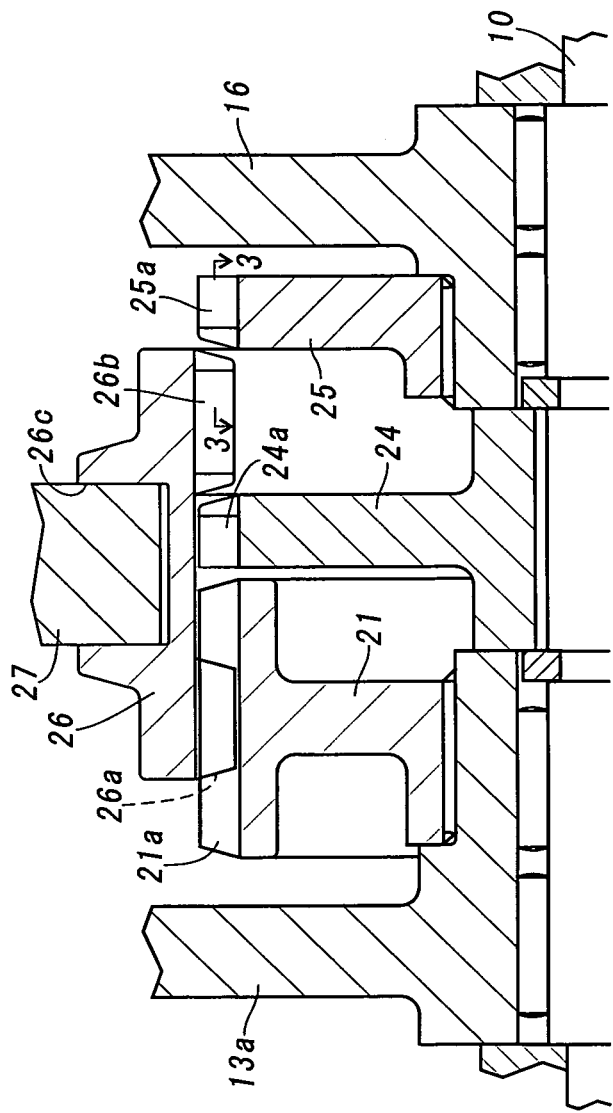

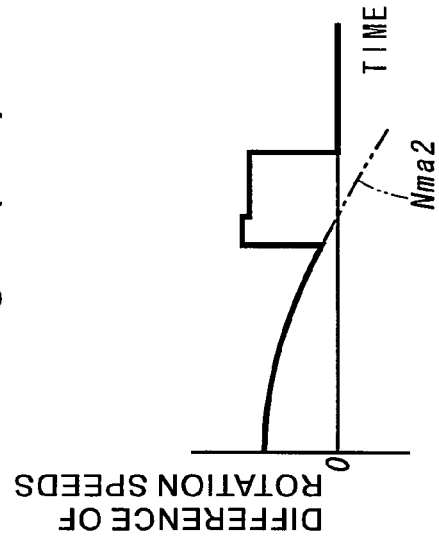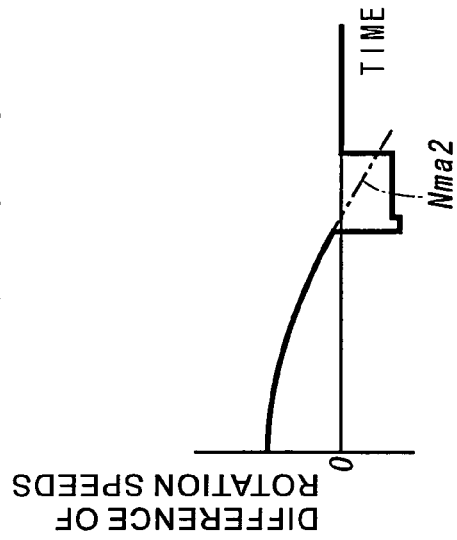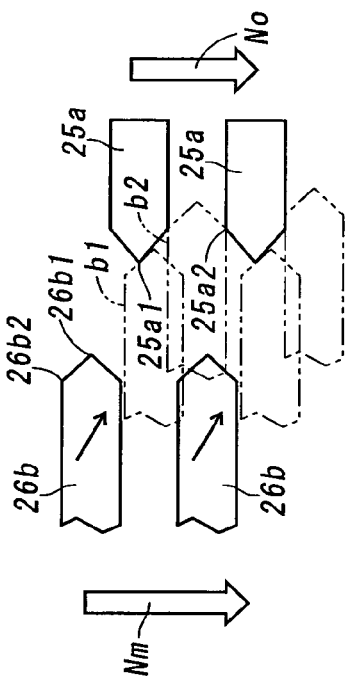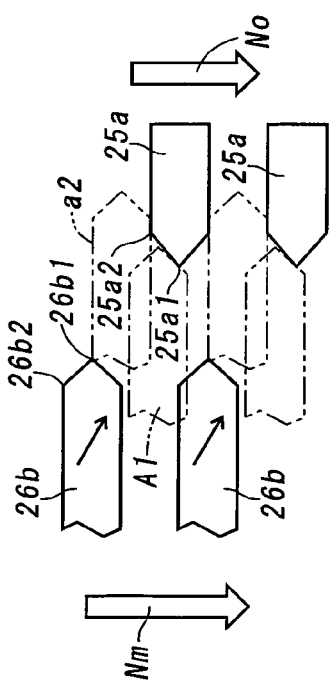

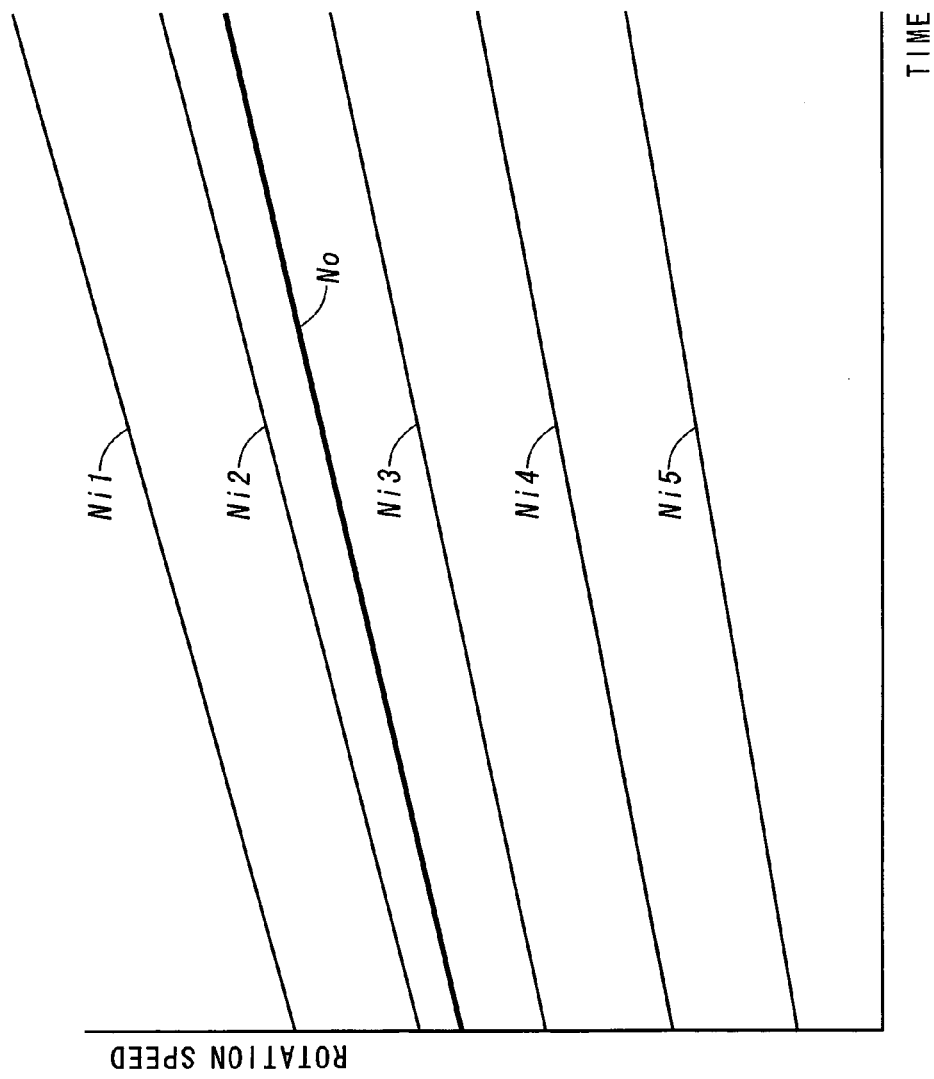

CONTROL DEVICE FOR ELECTRIC ROTATING MACHINE IN HYBRID-TYPE POWER TRANSMISSION

BACKGROUND OF THE INVENTION

1. Field of the Invention

The present invention relates to a hybrid-type power transmission in which an internal combustion engine and an electric rotating machine are used as a source of power for driving an output shaft through a change-speed mechanism.

2. Technical Background of the Invention

In the PCT application (PCT/JP2008/068678) filed on Oct. 15, 2008, one of the inventors has proposed a hybrid-type power transmission of this kind. As shown in FIGS. 1 and 2, the hybrid-type power transmission comprises an input shaft 10 for drive connection with an internal combustion engine 14, a change-speed mechanism 30 having a plurality of change-speed gear trains to be selectively established for transmitting a drive power from the input shaft 10 to an output shaft 11 at a selected speed ratio, a changeover mechanism 20 including a rotor-side rotary member 21 mounted on the input shaft for rotation with a rotor 13a of an electric rotating machine 13, an output-side rotary member 25 mounted on the input shaft 10 for rotation with a drive gear 16 in drive connection with the output shaft 11, an input-side rotary member 24 mounted on the input shaft 10 for rotation therewith between the rotor-side rotary member 21 and the output-side rotary member 25, and a sleeve 26 coupled with the rotor-side rotary member 21 for rotation therewith and shiftable in an axial direction to be selectively engaged with the output-side rotary member 25 or the input-side rotary member 24, and a control device 18 for controlling each operation of the electric rotating machine 13, the changeover mechanism 20 and the change-speed mechanism 30. The electric rotating machine 13 is in the form of a motor-generator activated under control of the control device 18 to drive the input shaft 10 or the output shaft 11 or to be driven by the input shaft 10 or the output shaft 11.

As shown in FIG. 1, the change-speed mechanism 30 includes the plurality of change-speed gear trains G1~G5 and a backward gear train GB arranged in parallel between the input and output shafts 10 and 11, and a plurality of clutches C1~C3 for changing over the gear trains G1~G5. The control device 18 is provided to selectively effect engagement of the clutches C1~C3 through a shift actuator 19 and shift-forks F1~F3 in response to instruction from a driver thereby to selectively establish a drive power train from the change-speed gear trains G1~G5 and backward gear train GB for transmission of drive power between the input shaft 10 and the output shaft 11. In a condition where a change-speed gear train was selected, the output shaft 11 is driven by the internal combustion engine 14 and/or the electric rotating machine 13 to drive left and right road wheels (not shown) through an output drive gear 31, an output driven gear 32, a differential 33 and drive shafts 34a, 34b.

As shown in FIGS. 1 and 2, the changeover mechanism 20 for selectively effecting drive connection of the electric rotating machine 13 with the input shaft 10 or the output shaft 11 includes the rotor-side rotary member 21 coupled with the rotor 13a of electric rotating machine 13 for rotation therewith, the input-side rotary member 24 mounted on the input shaft 10 for rotation therewith, the output-side rotary member 25 coupled with the drive gear 16 in drive connection with the output shaft 11 for rotation therewith, and the cylindrical sleeve 26 coupled with the rotor-side rotary member 21 for rotation therewith and shiftable in an axial direction to be engaged with the input-side rotary member 24 or the output-side rotary member 25 for transmission of the drive power.

As shown in detail in FIG. 2, the input-side rotary member 24 is coaxially mounted at its hub portion on the input shaft 10 by means of spline connection and fixed in place by means of fastening rings. At opposite sides of the input-side rotary member 24, the rotor 13a of the electric rotating machine 13 and the drive gear 16 are rotatably supported at their hub portions on the input shaft 10 through a needle roller bearing, respectively. The drive gear 16 is in drive connection with the output shaft 11 through a driven gear 17. The rotor-side rotary member 21 and output-side rotary member 25 are coaxially coupled at their hub portions with the rotor 13a and drive gear 16 for rotation therewith respectively by means of serration press-fit. The rotary members 21, 24, 25 are formed with outer splines 21a, 24a, 25a of the same cross-section, respectively. The input-side rotary member 24 is spaced from the output-side rotary member 25 in a distance. The cylindrical sleeve 26 is formed with axially spaced inner splines 26a and 26b. The first inner spline 26a is slidably engaged with the outer spline 21a of rotor-side rotary member 21, while the second inner spline 26b is selectively engaged with the outer spline 24a of input-side rotary member 24 or the outer spline 25a of output-side rotary member 25 in response to axial movement of the sleeve 26.

A shift-fork 27 is engaged with an annular groove 26c formed on the outer periphery of sleeve 26 to be operated by activation of the shift actuator 19 through a shift-rod 28 (see FIG. 1). When the sleeve 26 is placed at a center of its axial movement, the inner spline 26b of sleeve 26 is positioned between the input-side rotary member 24 and output-side rotary member 25. When the shift actuator 19 is activated under control of the control device 18 in response to an instruction of a driver, the sleeve 26 is shifted in an axial direction to be selectively engaged to the outer spline 24a of input-side rotary member 24 or the outer spline 25a of output-side rotary member 25.

For smooth engagement of the splines in shift movement of the sleeve, it is required to synchronize the rotation speed of rotor-side rotary member 21 with the rotation speed of the input-side rotary member 24 or the output-side rotary member 25. In the changeover mechanism 20, the electric rotating machine 13 is operated under control of the control device 18 to synchronize the rotation speed of rotor-side rotary member 21 with the rotation speed of input-side rotary member 24 or the output-side rotary member 25.

When a friction clutch 15 in the hybrid-type power transmission is engaged during operation of the internal combustion engine 14 in a condition where either one of the gear trains of the change-speed mechanism 30 was selected, the drive road wheels of the vehicle are driven by the engine 14 through the selected gear train. When the speed reduction ratio of the drive gear 16 and driven gear 17 is selected between the speed reduction ratios of the second change-speed gear train G2 and the third change-speed gear train G3, the rotation speed of output-side rotary member 25 changes during lapse of a time as shown by a solid line No in FIG. 7. In such an instance, the rotation speed of the input-side rotary member 24 changes in accordance with the change-speed ratio of the selected gear train as shown by solid lines Ni1~Ni5. In the graph of FIG. 7, the rotation speed of input-side rotary member 24 is represented by the solid line Ni1 when the first change-speed gear train 01 is selected and represented by the solid line Ni2 when the second change-speed gear train G2 is selected. In a condition where the change-speed gear trains were selected as described above, the changeover mechanism 20 is operated under control of the control device 18 in such a manner that the rotor-side rotary member 21 is brought into engagement with the input-side rotary member 24 or the output-side rotary member 25 in accordance with a depressed amount of an acceleration pedal, the selected change-speed gear train, the rotation speeds of the input and output shafts 10, 11, and acceleration of the vehicle.

Illustrated in FIG. 6 is a condition where the rotor-side rotary member 21 is selectively connected with the output-side rotary member 25 or the input-side rotary member 24 being rotated by the first change-speed gear train G1 or the second change-speed gear train G2. When the rotor-side rotary member 21 is disconnected from the input-side rotary member 24 and connected with the output-side rotary member 25, the shift actuator 19 is activated under control of the control device 18 to shift the sleeve 26 in such a manner as to disconnect the second inner spline 26b of sleeve 26 from the outer spline 24a of input-side rotary member 24. In such an instance, the electric rotating machine 13 is activated under control of the control device 18 to synchronize the rotation speed of rotor-side rotary member 21 with the rotation speed of output-side rotary member 25. To effect the synchronization, the rotation speed of the output-side rotary member 25 is defined as a target rotation speed No. Thus, the activation, of electric rotating machine 13 is controlled in such a manner that the rotation speed Nmc of rotor-side rotary member 21 approaches the target rotation speed No at a speed proportional to a difference with the target rotation speed No. With such control of the electric rotating machine 13, the rotation speed Nine of rotor-side rotary member 21 decreases as shown in FIG. 6 and approaches to the target rotation speed No. After synchronized with the target rotation speed No, the rotation speed Nmc further decreases due to mechanical resistances in the electric rotating machine during lapse of a time after start of the shift operation of the sleeve 26. After synchronization of the rotation speed Nmc with the target rotation speed No, the shift actuator 19 is activated again under control of the control device 18 to shift the sleeve 26 in such a manner as to bring the second inner spline 26b into engagement with the outer spline 25a of output-side rotary member 25 thereby to connect the rotor-side rotary member 21 to the output-side rotary member 25.

Illustrated in FIG. 3(a1) are the second inner spline 26b of sleeve 26 and the outer spline 25a of output-side rotary member 25 to be engaged with each other upon synchronization of the rotation speed Nmc with the target rotation speed No. As shown in the figure, the distal ends of splines 26b and 25a are spaced in a distance in an axial direction. The lapse of a time after start of the shift operation of sleeve 26 is caused by the distance between the distal ends of splines 28b and 25a and is affected by the shift speed of sleeve 26 and phase relationship between the splines 26b and 25a. The lapse of the time after synchronization of the rotation speed Nmc with the target rotation speed No will become a minimum value Tm1 when the chamfer apex 26b 1 of the second inner spline 26b is engaged with the chamfer apex 25a1 of outer spline 25a and will become a maximum value Tm2 when the chamfer proximal end 26b 2 of the second inner spline 26 is engaged with the chamfer proximal end 25a 2 of the outer spline 25a. (see imaginary lines b2 in FIG. 3(b1)).

As described above, the rotation speed Nmc of sleeve 26 in slidable engagement with the rotor-side rotary member 21 is decreased after synchronized with the target rotation speed No as shown by the imaginary line Nmc1 in FIG. 6 and is rapidly increased when the sleeve 26 is engaged with the output-side rotary member 25 between the minimum lapse of the time Tm1 and the maximum lapse of the time Tm2.

When the rotor-side rotary member 21 is disconnected from the output-side rotary member 25 and connected to the input-side rotary member 24, the shift actuator 19 is activated under control of the control device 18 to shift the sleeve 26 in such a manner as to disconnect the second inner spline 26b from the outer spline 25a of output-side rotary member 25, while the electric rotating machine 13 is activated under control of the control device to synchronize the rotation speed of rotor-side rotary member 21 with the rotation speed of input-side rotary member 24. After synchronization of the rotation speeds, the shift actuator 19 is sequentially activated under control of the control device 18 to shift the sleeve 26 in such a manner as to bring the second inner spline 26b of sleeve 26 into engagement with the outer spline 24a of input-side rotary member 24. In such an instance, the rotation speed Nmd of sleeve 26 is increased by synchronization with the rotation speed of input-side rotary member 24 and is once decreased after synchronization with the rotation speed of input-side rotary member 24 as shown by an imaginary line Nmd1 in FIG. 6. Subsequently, the rotation speed Nmd1 of sleeve 26 is rapidly increased to the rotation speed Ni of input-side rotary member 24 when the sleeve 26 is engaged with the input-side rotary member 24 between the minimum lapse of the time Tm1 and the maximum lapse of the time Tm2.

As described above, the electric rotating machine is activated under control of the control device to synchronize the rotation speed of rotor-side rotary member 21 with the rotation speed of input-side rotary member 24 or output-side rotary member 25 in shifting operation of the sleeve 26. In such an instance, the rotation speed of sleeve 26 is rapidly increased after once decreased when the sleeve is shifted to bring the rotor-side rotary member 21 into engagement with the output-side rotary member 25 or the input-side rotary member 24. This causes impact noise in shifting operation of the sleeve 26 in the changeover mechanism 20.

SUMMARY OF THE INVENTION

A primary object of the present invention is to provide a control device for the electric rotating machine in the hybrid-type power transmission capable of solving the problem discussed above.

According to the present invention, the object is accomplished by providing a hybrid-type power transmission comprising an input shaft for drive connection with an internal combustion engine, a change-speed mechanism having a plurality of change-speed gear trains to be selectively established for transmitting a drive power from the input shaft to an output shaft at a selected speed ratio, and a changeover mechanism for selectively effecting drive connection of an electric rotating machine with the input shaft or the output shaft. The changeover mechanism includes a rotor-side rotary member mounted on the input shaft for rotation with a rotor of the electric rotating machine, an output-side rotary member mounted on the input shaft for rotation with a drive gear in drive connection with the output shaft, an input-side rotary member mounted on the input shaft for rotation therewith between the rotor-side rotary member and the output-side rotary member, and a sleeve coupled with the rotor-side rotary member for rotation therewith and shiftable in an axial direction to be selectively engaged with the output-side rotary member or the input-side rotary member. A control device for the change-speed mechanism and the electric rotating machine is arranged to control the rotation speed of the electric rotating machine in such a manner that the rotation speed of the rotor-side rotary member synchronizes with a target speed higher in a predetermined difference than the rotation speed of the input-side or output-side rotary member in shifting operation of the sleeve.

In a practical embodiment of the present invention, the difference of the rotation speeds of the rotor-side rotary member and the input-side or output-side rotary member is determined in such a manner that the rotation speed of the rotor-side rotary member decreases less than that of the input-side or output-side rotary member at a time when the sleeve is brought into engagement with the input-side or output-side rotary member after synchronization of the rotation speed of the rotor-side rotary member with the target speed.

BRIEF DESCRIPTION OF THE DRAWINGS

In the drawings,

FIG. 2 is a partly enlarged sectional view of a changeover mechanism in the hybrid-type power transmission shown in FIG. 1, FIGS. 3($a$1), 3($b$1) each illustrate a section circumferentially taken along 3-3 in FIG. 2, FIGS. 3($a$2), 3$b$2) each illustrate the rotation speed of the rotor-side rotary member after synchronization with the rotation speed of the output-side rotary member, FIGS. 4($a$1), 3($b$1) each illustrate a modification of each chamfer of the inner and output splines shown in FIGS. 3($a$1), 3($b$1), FIGS. 4($a$2), 3$b$2) each illustrate the rotation speed of the rotor-side rotary member after synchronization with the rotation speed of the output-side rotary member, FIG. 7 is a graph illustrating change of the rotation speed of the input-side rotary member in the changeover mechanism.

DESCRIPTION OF THE PREFERRED EMBODIMENTS

Figure 1:
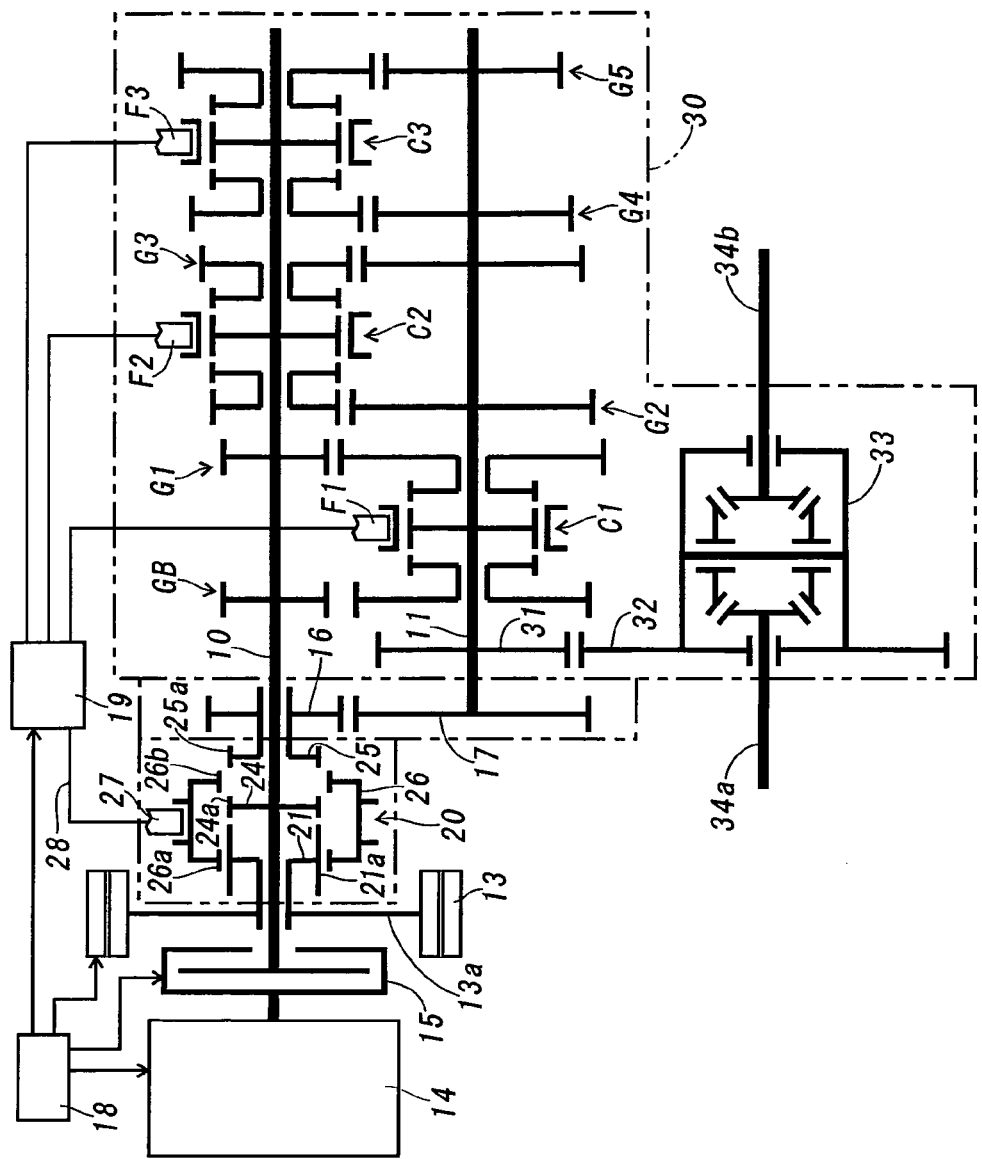
FIG. 1 is a skeleton view illustrating components of a hybrid-type power transmission.
Figure 5:
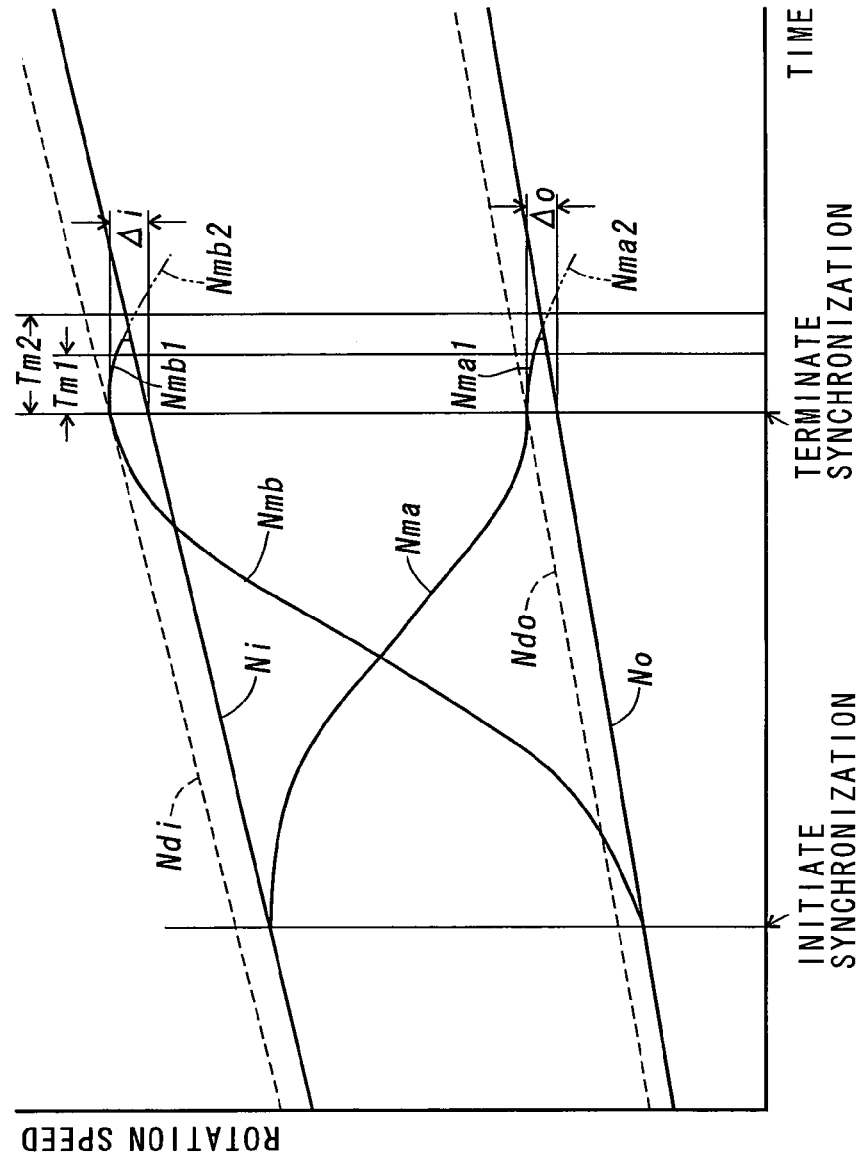
FIG. 5 is a graph illustrating transition of the rotation speed of the rotor-side rotary member in shifting operation of the sleeve in the changeover mechanism.
Figure 6:
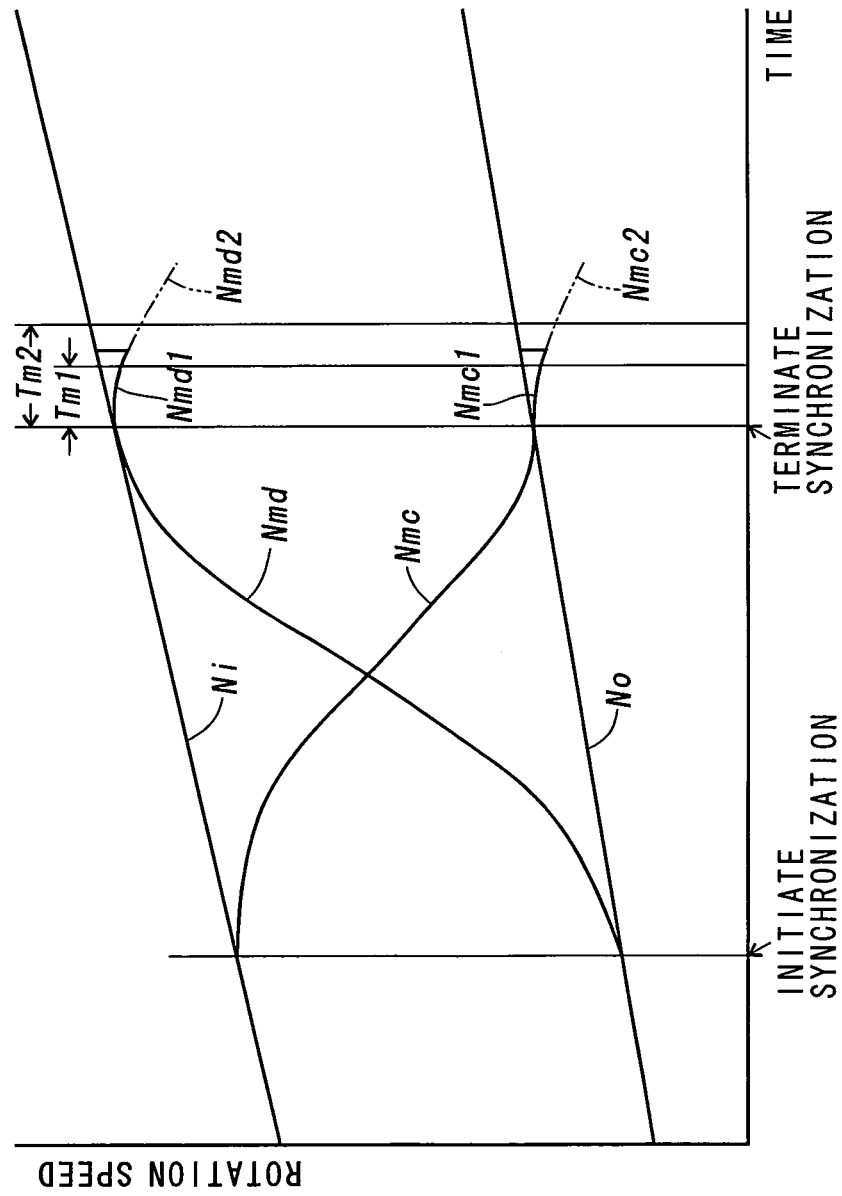
FIG. 6 is a graph illustrating transition of the rotation speed of the rotor-side rotary member in shifting operation of the sleeve in the changeover mechanism.

Hereinafter, a preferred embodiment of the present invention adapted to the hybrid-type power transmission described above with reference to FIGS. 1 and 2 will be described with reference to FIG. 5. Assuming that the sleeve 26 of the changeover mechanism 20 is shifted by operation of the shift actuator under control of the control device 18 to connect the rotor-side rotary member 21 to the output-side rotary member 25 in a condition where the rotation speed of input-side rotary member 24 is higher than the rotation-speed of output-side rotary member 25 as shown in FIG. 5, the electric rotating machine 13 is activated under control of the control device 18 to synchronize the rotation speed of rotor-side rotary member 21 with the rotation speed of output-side rotary member 25. In this embodiment, a rotation speed in a difference Δo higher than the rotation speed No of the output-side rotary member 25 is defined as a target rotation speed Ndo for synchronization. Thus, the electric rotating machine 13 is operated under control of the control device 19 in such a manner that the rotation speed Nma of rotor-side rotary member 21 decreases and synchronizes with the target rotation speed Ndo as shown in FIG. 5. After synchronized with the target rotation speed Ndo, the rotation speed Nma of rotor-side rotary member 21 further decreases less than the target rotation speed Ndo due to mechanical resistances in the electric rotating machine 13 as shown by an imaginary line Nma2.

In this embodiment, the difference Δo is determined in such a manner that the imaginary line Nma2 indicative of the rotation speed of rotor-side rotary member 21 crosses the solid line No indicative of the rotation speed of output-side rotary member 25 at a time between the minimum and maximum lapse of times Tm1 and Tm2 during which the apex of inner spline 26$b$ of sleeve 26 is brought into engagement with the apex of outer spline 25$a$ of output-side rotary member 25. Practically, the difference Δo is determined on a basis of various factors such as a selected gear train, each rotation speed of the input and output shafts 10, 11, acceleration of the vehicle, a temperature affecting stir-resistance of lubricant, etc.

When the inner spline of sleeve 26 is engaged with the outer spline of output-side rotary member 25 at the time between the minimum and maximum lapse of times Tm1 and Tm2, the rotation speed Nma of sleeve 26 is changed over to the rotation speed No of output-side rotary member 25. In the case that the target rotation speed Ndo is determined as described above, the difference between the rotation speeds of sleeve 26 and output-side rotary member 25 becomes zero in a small extent between the minimum and maximum lapse of times Tm1 and Tm2.

When the shift actuator 19 is activated under control of the control device 18 to shift the sleeve in such a manner as to disconnect the rotor-side rotary member 21 from the output-side rotary member 25, the electric rotating machine 13 is activated under control of the control device 19 to synchronize the rotation speed of rotor-side rotary member 21 with the input-side rotary member 24. In such an instance, a rotation speed in a difference Δi higher than the rotation speed Ni is defined as a target rotation speed Ndi in the same manner as described above. Thus, the electric rotating machine 13 is activated under control of the control device 18 in such a manner that the rotation speed Nmb of rotor-side rotary member 21 increases and synchronizes with the target rotation speed Ndi as shown in FIG. 5. After synchronized with the target rotation speed Ndi, the rotation speed Nmb of rotor-side rotary member 21 decreases less than the target rotation speed Ndi due to mechanical resistance in the electric rotating machine 13 as shown by an imaginary line Nmb2.

As shown in FIG. 3($a$1), the inner spline 26$b$ of sleeve 26 is formed at its opposite ends with a chamfer of triangle in cross-section to be engaged with a chamfer of triangle in cross-section formed on each distal end of the outer splines 24$a$, 25$a$ of input-side and output-side rotary members 24, 25. As the rotation speed Nma of sleeve 26 is higher than the rotation speed No of the output-side rotary member 25 after synchronization with the target rotation speed Ndi as described above, the inner spline 26$b$ of sleeve 26 tend to be moved toward the outer spline 25$a$ of output-side rotary member 25 in shifting operation of the sleeve 26 as shown by solid arrows in FIG. 3($a$1). If in such an instance, the chamfer of inner spline 26$b$ is brought into engagement at its front side with the back side of the chamfer of outer spline 25$a$ in a rotation direction, the difference between the rotation speeds of sleeve 26 and output-side rotary member 25 decreases as shown in FIG. 3($a$2). When the chamfer of sleeve 26 is moved back in a reverse rotation direction by engagement with the chamfer of output-side rotary member 25, the difference of the rotation speeds becomes minus. When the proximal end 26$b$ 2 of the chamfer of inner spline 26$b$ displaces over the proximal end 25$a$ 2 of the chamfer of outer spline 25$a$, the difference between the rotation speeds of sleeve 26 and output-side rotary member 25 becomes zero.

If as shown in FIG. 3(b1), the chamfer of inner spline 26b is brought into engagement at its back side with the front side of the chamfer of outer spline 25a in a rotation direction, the difference between the rotation speeds of sleeve 26 and output-side rotary member 25 decreases as shown in FIG. 3(b2). When the chamfer of sleeve 26 is engaged with the chamfer of outer spline 25a as shown by an imaginary line b1, the sleeve 26 is moved in the rotation direction to increase the difference of the rotation speeds of sleeve 26 and output-side rotary member 25. When the proximal end 26b2 of the chamfer of inner spline 26a displaces over the proximal end 25a2 of the chamfer of outer spline 25a, the difference between the rotation speeds of sleeve 26 and output-side rotary member 25 becomes zero.

As the difference between the rotation speeds of rotor-side rotary member 21 and input-side rotary member 24 or output-side rotary member 25 becomes extremely small in shifting operation of the changeover mechanism, the pushback force acting on the sleeve 26 becomes extremely small, and the occurrence of impact noise in shifting operation is extremely reduced. This is effective to bring the sleeve 26 into smooth engagement with the input-side rotary member 24 or output-side rotary member 25.

Figure 4:
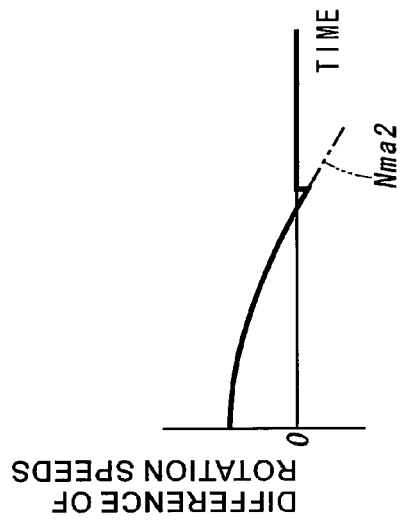
Figure 4:
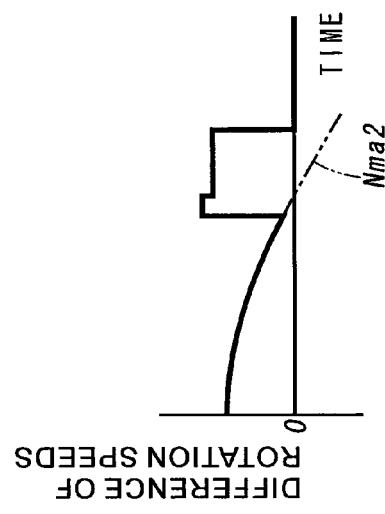
Figure 4:
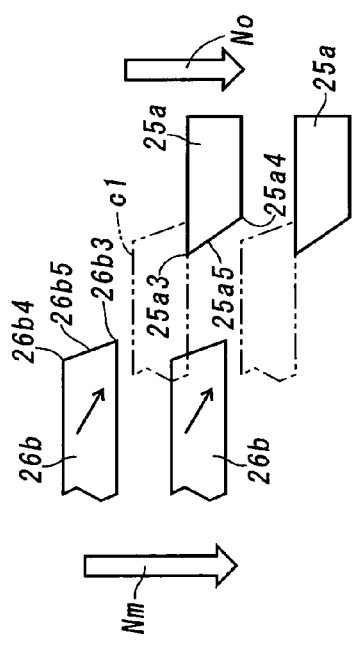
Figure 4:
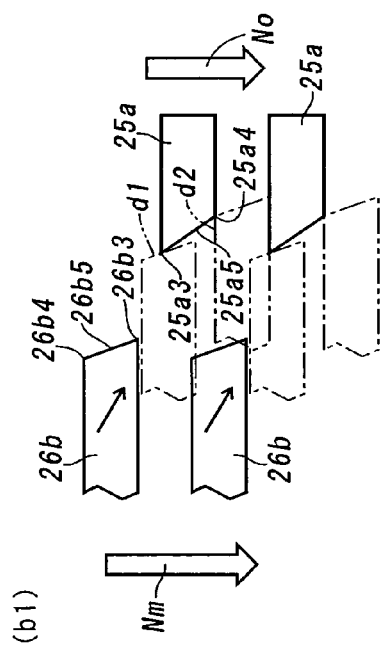

Illustrated in FIGS. 4(a1), 4(b1) is a modification of each chamfer of the inner spline 26b of sleeve 26 and outer splines 24a, 25a of rotary members 24, 25 in the changeover mechanism. In this modification, each chamfer of the inner spline 26b is formed at its backside with an inclined surface 26b 5, while each chamfer of the outer splines 24a, 25a of rotary members 24, 25 is formed at its front side with an inclined surface 24a 5, 25a 5. When the sleeve 26 is shifted to the output-side rotary member 25, the inner spline 26b of sleeve 26 is displaced toward the outer spline 25a of output-side rotary member 25 as shown by solid arrows and brought into engagement with the outer spline 25a as shown in FIG. 4(a1) or 4(b1).

When the inner spline 26b of sleeve 26 is brought into engagement with the outer spline 25a of output-side rotary member 25 as shown in FIG. 4(a1), the difference between the rotation speeds of sleeve 26 and output-side rotary member 25 decreases as shown by an imaginary line Nma2 in FIG. 4(a2). When the splines 26b and 25a are engaged with each other at their side surfaces as shown by an imaginary line c1, the difference between the rotation speeds of sleeve 26 and output-side rotary member 25 becomes zero without any increase as shown in FIG. 4(a2). When the inner spline 26b of sleeve 26 is brought into engagement with the outer spline 25a of output-side rotary member 25 as shown in FIG. 4(b1), the difference between the rotation speeds of sleeve 26 and output-side rotary member 25 decreases as shown by an imaginary line Nma2 in FIG. 4(b2). When the splines 26b and 25a are engaged with each other at their chamfers, the sleeve 26 is moved in the rotation direction to increase the difference between the rotation speeds as shown in FIG. 4(b2). When the proximal end 26b4 of inner spline 26b displaces over the proximal end 25a4 of outer spline 25a as shown by an imaginary line d2 in FIG. 4(b1), the difference between the rotation speeds becomes zero as shown in FIG. 4(b2).

What is claimed is:

1. A hybrid-type power transmission comprising an input shaft for drive connection with an internal combustion engine, a change-speed mechanism having a plurality of change-speed gear trains to be selectively established for transmitting a drive power from the input shaft to an output shaft at a selected speed ratio, and a changeover mechanism for selectively effecting drive connection of an electric rotating machine with the input shaft or the output shaft, wherein the changeover mechanism includes a rotor-side rotary member mounted on the input shaft for rotation with a rotor of the electric rotating machine, an output-side rotary member mounted on the input shaft for rotation with a drive gear in drive connection with the output shaft, an input-side rotary member mounted on the input shaft for rotation therewith between the rotor-side rotary member and the output-side rotary member, and a sleeve coupled with the rotor-side rotary member for rotation therewith and shiftable in an axial direction to be selectively engaged with the output-side rotary member or the input-side rotary member, wherein a control device for the change-speed mechanism and the electric rotating machine is arranged to control the rotation speed of the electric rotating machine in such a manner that the rotation speed of the rotor-side rotary member synchronizes with a target speed higher in a predetermined difference than the rotation speed of the input-side or output-side rotary member in shifting operation of the sleeve.

2. A hybrid-type power transmission as claimed in claim 1, wherein the difference between the rotation speeds of the rotor-side rotary member and the input-side or output side rotary member is determined in such a manner that the rotation speed of the rotor-side rotary member decreases less than that of the input-side or output-side rotary member at a time when the sleeve is brought into engagement with the input-side or output-side rotary member after synchronization of the rotation speed of the rotor-side rotary member with the target speed.

3. A hybrid-type power transmission as claimed in claim 1, wherein the input-side rotary member is mounted on the input shaft between the rotor-side rotary member and the output-side rotary member coaxially therewith, and wherein the sleeve is mounted on the rotor-side rotary member by spline connection for shift movement in an axial direction, the sleeve being formed with an inner spline to be selectively engaged with an outer spline respectively formed on the input-side rotary member and the output-side rotary member.

* * * * *